United States Patent
Sasaki et al.

(10) Patent No.: US 6,322,010 B1
(45) Date of Patent: Nov. 27, 2001

(54) PAINT COATING APPARATUS AND MAGNETIC RECORDING MEDIUM

(75) Inventors: Kazuo Sasaki; Yasuyuki Kudo, both of Miyagi (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/457,130

(22) Filed: Dec. 9, 1999

(30) Foreign Application Priority Data

Dec. 25, 1998 (JP) .................................................. 10-370700

(51) Int. Cl.$^7$ ............................................................ B05B 1/14

(52) U.S. Cl. .............................................................. 239/568

(58) Field of Search ...................................... 239/549, 568

(56) References Cited

U.S. PATENT DOCUMENTS 5,816,506 * 10/1998 Watanabe et al. .................... 239/568

* cited by examiner

*Primary Examiner*—Lesley D. Morris
(74) *Attorney, Agent, or Firm*—Sonnenschein, Nath & Rosenthal

(57) ABSTRACT

The present invention provides a paint coating apparatus having a die head capable of simultaneously forming at least two paint layers on a surface of a support body into thin and uniform films. The paint coating apparatus includes a die head having a front lip, a first paint discharge slit to discharge a first layer paint, an intermediate lip, a second paint discharge slit to discharge a lower layer paint, and a rear lip arranged in this order from the upstream at least in the travel direction of the support body, wherein one of a curved plane and slanting plane is formed at a ridge line formed by a tip surface of the intermediate lip and a wall surface of the second paint discharge slit.

2 Claims, 5 Drawing Sheets

PAINT COATING APPARATUS AND MAGNETIC RECORDING MEDIUM

BACKGROUND OF THE INVENTION

1. Field of the Invention

The present invention relates to a paint coating apparatus and a magnetic recording medium and in particular, to a paint coating apparatus having a die head for simultaneously forming at least two paint layers on a surface of a support body and a magnetic recording medium using the same.

2. Description of the Prior Art

Conventionally, a magnetic recording medium such as an audio tape and a video tape is formed by painting a magnetic paint on a flexible support body such as polyester. The magnetic paint is prepared by a magnetic powder, binder, dispersing agent, and lubricant which are dispersed into and kneaded with an organic solvent. This is a so-called paint type magnetic recording medium. The paint is applied onto the support body by the roll coat method such as gravure roll method and reverse roll method. Recently, the extrusion method has been implemented in practice, enabling to obtain more uniform thin film coating. In the paint coating apparatus employing this extrusion method, it has been cleared that the paint coating quality is greatly affected by the die head tip configuration which is brought into abutment with the flexible support body.

FIG. 1 is an enlarged schematic view of the die head tip end, where a front lip 2a, a first paint discharge slit 2b, an intermediate lip 2c, a second paint discharge slit 2d, and a rear lip 2e are arranged in this order from the upstream. At least a plurality of paint liquids are simultaneously applied to the support body 1 so as to form layers. that is, in the example of FIG. 1, a lower paint is discharged with a predetermined pressure from the first paint discharge slit 2b and almost simultaneously with this, an upper paint is discharged with a predetermined pressure from the second paint discharge slit 2d, thus forming two paint layers almost simultaneously. In a paint application apparatus using such a die head 2, even if the lower paint and the upper paint have different viscosities, it is necessary to obtain a desired thickness of the lower layer and a desired thickness of the upper layer. Especially recently, a shorter wave of recording is desired in the magnetic recording medium, which requires a further uniform and thin magnetic layer, increasing the importance of the tip configuration of the die head 2.

In the conventionally used die head 2, for example, if the lower paint has a lower viscosity than the upper paint, the upper paint forms a thicker film, and it becomes difficult to obtain a desired thickness. The upper paint and the lower paint usually have a viscosity of 1000 to 2000 cps in the B-type viscosity meter and there is no big difference between them. However, when the binder contained in the paint is changed, the lower paint may have a lower viscosity by 50 to 400 cps.

FIG. 2 is a graph showing a paint pressure distribution between the front lip 2a and the rear lip 2e when the viscosity is 1000 to 2000 cps by the B-type viscosity meter. FIG. 3 is a graph showing the paint pressure distribution between the front lip 2a and the rear lip 2e when the upper paint has a viscosity of 1000 to 2000 cps measured by the B-type viscosity meter and the lower paint has a viscosity lower than 400 cps measured by the B-type viscosity meter.

As is clear from comparison between FIG. 2 and FIG. 3, in contrast to case when both of the upper paint and the lower paint have viscosity from 1000 to 2000 cps, when the upper paint has viscosity of 1000 to 2000 cps but the lower paint has viscosity lower than 400 cps, the coating pressure of the lower paint from the front lip 2a to the intermediate lip 2c is lowered and the coating pressure of the upper paint from the second paint discharge slit 2d to the rear lip 2e is increased.

In this case, thought the cause is unknown, the upper paints forms a paint film thicker by 20 to 30% even when the paint supply rate to the die head 2 is maintained constant. That is, as the lower paint has a lower viscosity, the upper paint tends to form a thicker film. This problem should be solved for obtaining a uniform thickness of the magnetic layer.

SUMMARY OF THE INVENTION

It is therefore an object of the present invention to provide a paint coating apparatus having a die head capable of simultaneously forming at least two layers of paint films of thin and uniform thickness using a lower layer paint having a lower viscosity than an upper layer paint on a surface of a support body.

In order to solve the aforementioned problem, the paint coating apparatus includes a die head tip portion having a front lip, a first paint discharge slit, an intermediate lip, a second paint discharge slit, and a rear lip arranged in this order from the upstream at least in the travel direction of a support body, wherein one of a curved plane and slanting plane is formed at the ridge line formed by the tip surface of the intermediate lip and the wall of the second paint discharge slit.

Moreover, the present invention includes a magnetic recording medium prepared by this paint coating apparatus.

A curved plane or slanting plane formed at a ridge line formed by the intermediate lip and the second paint discharge slit functions to reduce the pressure of the upper layer paint discharged from the second paint discharge slit. Accordingly, even if the lower layer paint has a comparatively low viscosity, it is possible to obtain a thin and uniform film of the upper layer formed by the upper layer paint.

DESCRIPTION OF PREFERRED EMBODIMENTS

The present invention can be applied to a paint coating apparatus comprising a die head 2' having a front lip 2a', a first paint discharge slit 2b', intermediate lip 2c', a second paint discharge slit 2d', and a rear lip 2e' in this order from the upstream at least in the travel direction of the a support body 1'. The invention can further be applied to a magnetic recording medium prepared using the paint coating apparatus. Hereinafter, an embodiment of the present invention will be explained with reference to FIG. 4 and FIG. 5. It should be noted that like components as in the conventional technique are denoted by like reference symbols.

Figure 4:
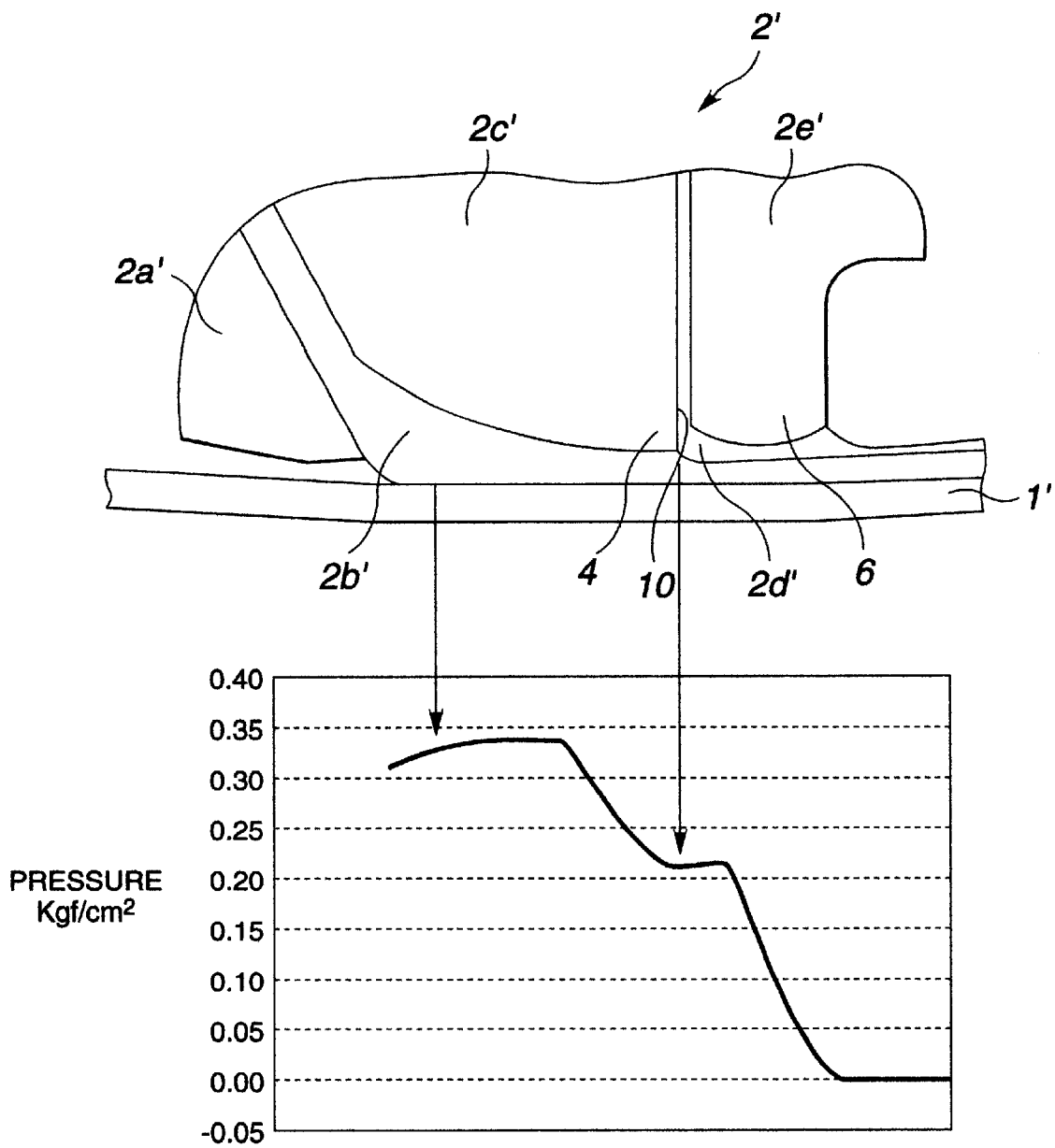
FIG. 4 is a graph showing a paint application pressure distribution between the front lip and the rear lip of the die head according to the present invention.

FIG. 4 is a graph showing a coating pressure distribution between the front lip 2a' and the rear lip 2e' obtained by using the die head 2'. The die head 2' has a curved plane or slanting plane 12 at a ridge line 10 forced by a tip surface 4 of the intermediate lip 2c' and a wall surface 6 of the second paint discharge slit 2d' when the upper layer paint has a viscosity of 1000 to 2000 cps and the lower layer paint has a viscosity lower than 400 cps.

Figure 1:
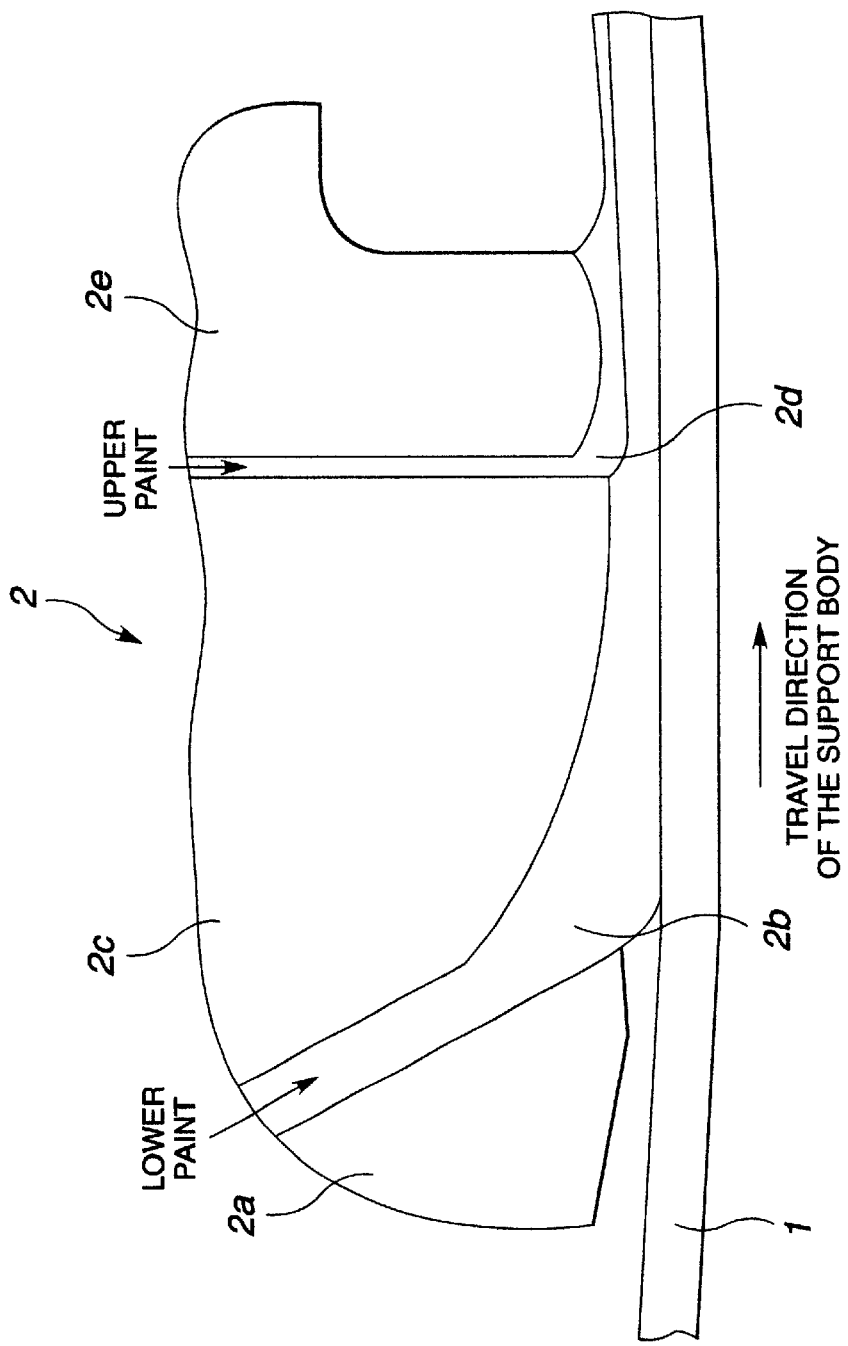
FIG. 1 is an enlarged schematic view of a conventional die head tip portion.
Figure 2:
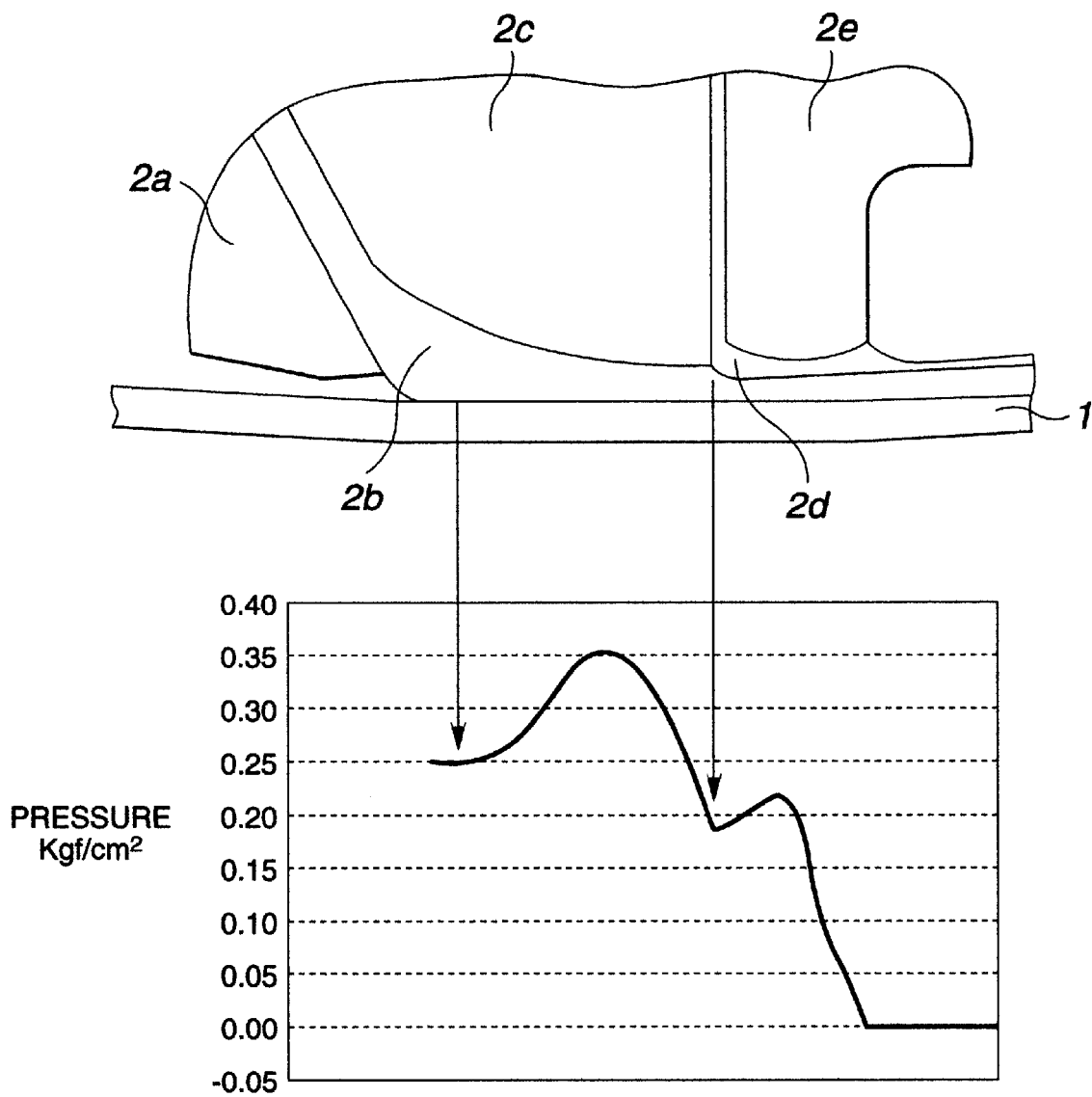
FIG. 2 is a graph showing a paint application pressure distribution between the front lip and the rear lip when the upper layer paint and the lower layer paint have almost identical viscosity in a conventional die head.
Figure 3:
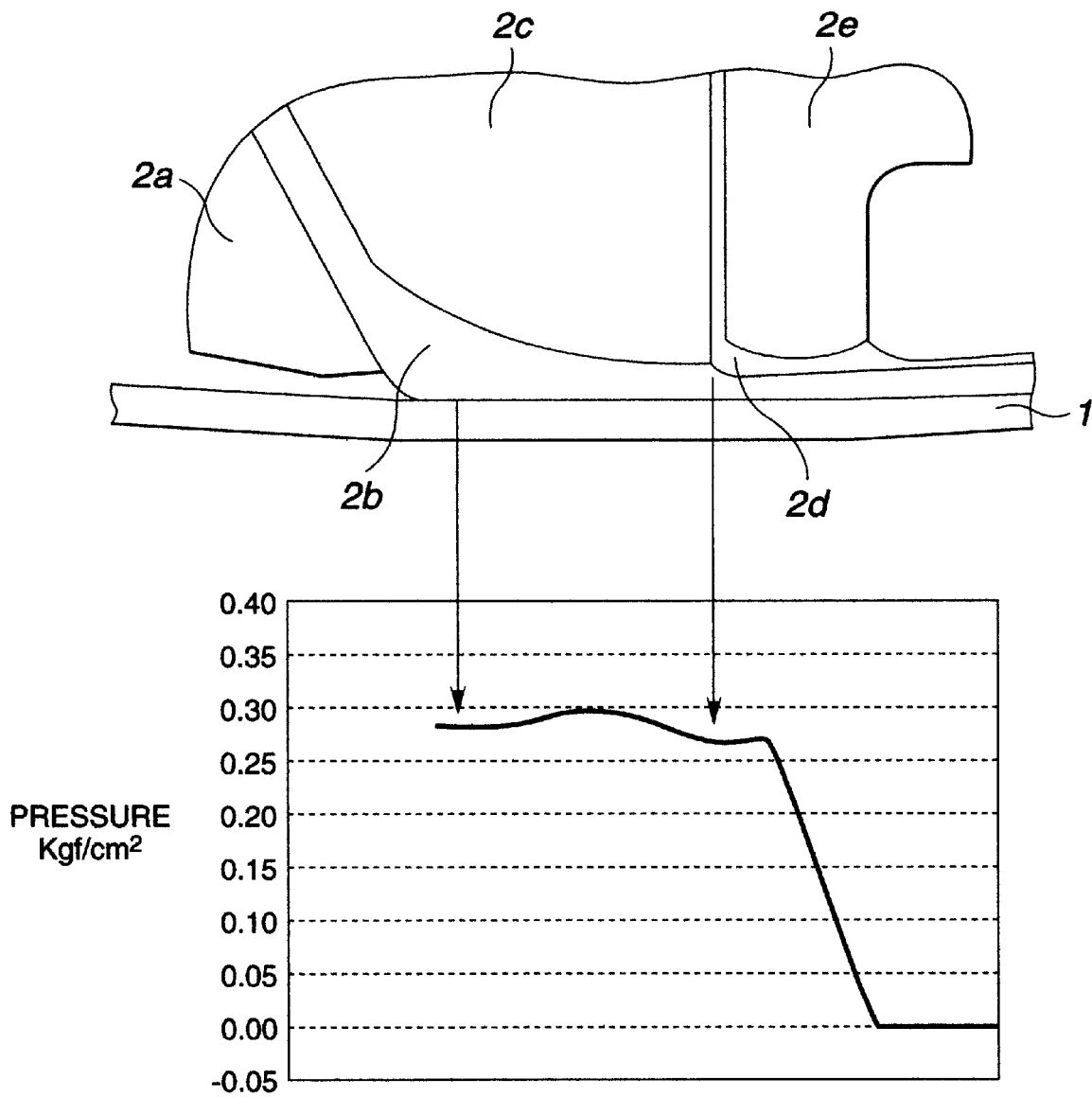
FIG. 3 is a graph showing a paint application pressure distribution between the front lip and the rear lip when the lower layer paint has a lower viscosity than the upper layer paint.

As is clear from comparison of a FIG. 4 with the conventional technique shown in FIG. 2, the coating pressure of the upper layer paint from the paint discharge slit 2d' toward the rear lip 2e' is reduced. Accordingly, even in a case using a lower layer paint having a comparatively low viscosity, it is possible to obtain a uniform thinner thickness of the upper layer paint. A magnetic recording medium prepared by using this paint coating apparatus can realize a shorter recording wave.

Figure 5:
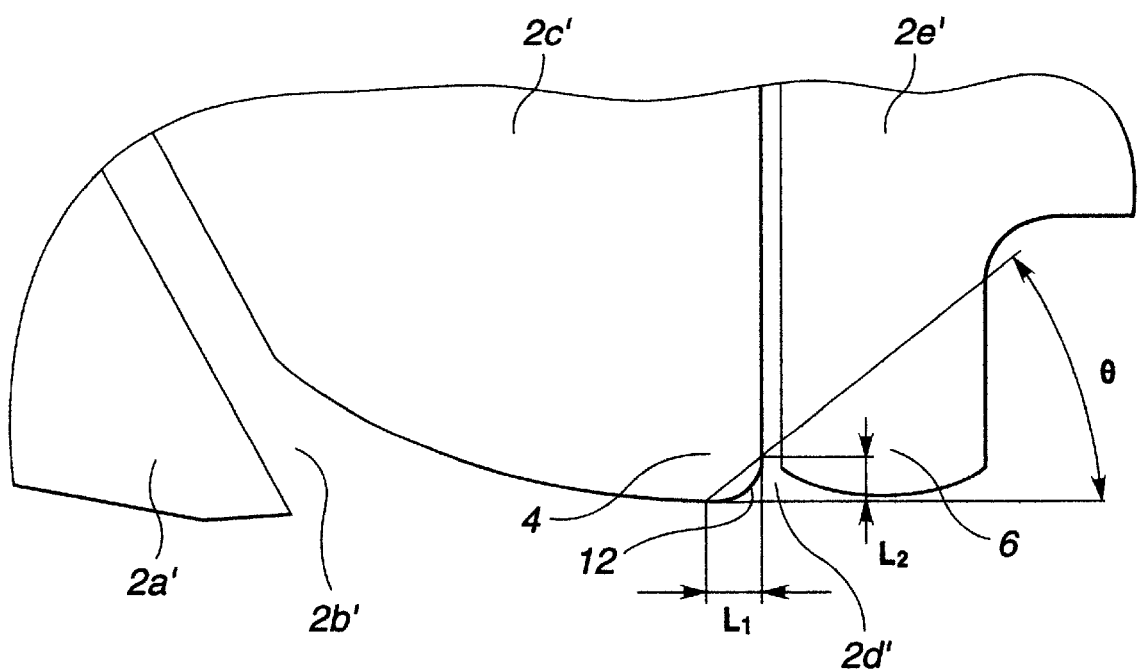
FIG. 5 is an enlarged schematic view of the die head tip portion according to the present invention.

As shown, FIG. 5 is an enlarged schematic view of the tip surface 4 of the die head 2'. The curved plane or slanting plane 12 formed at the ridge line 10 between the tip surface 4 of the intermediate lip 2c' and the wall surface 6 of the second paint discharge slit 2d should satisfy $\log=-0.44\log(L_1/\text{coating thickness})+1.5$ wherein $L_1$ represents a curved plane or slanting plane formation length in the traveling direction of the support body 1'. $L_2$ represents an orthogonal length which intersects $L_1$, and being an interior angle defined by $L_1/L_2$. As shown in FIG. 5, the tip surface 4 is rounded when facing the rear lip 2e'. Accordingly, the tip surface 4 is oblique to the support body 1'. The coating thickness is a total of a plurality of coating films.

Even when at least two paint films are simultaneously formed using a lower layer paint having a lower viscosity than the upper layer paint, the paint coating apparatus according to the present invention enables to obtain a uniform thin upper layer formed by the upper layer paint. A magnetic recording medium prepared using this paint coating apparatus can realize a shorter recording wave.

What is claimed is:

1. A paint coating apparatus, comprising:

a die head having a front lip, a first paint discharge slit, an intermediate lip, a second paint discharge slit, and a rear lip arranged in an upstream order at least in the travel direction of a support body, the die head further having a curved plane, the curved plane formed at a ridge line wherein the ridge line is formed by a tip surface of the intermediate lip and a wall surface of the second paint discharge slit, the curved plane being positioned oblique to the support body; and wherein the curved plane formed at the ridge line satisfies the relationship $$\text{Log}\theta=-0.44\text{Log}(L_1/\text{paint coating thickness})+1.5$$

where $L_1$ represents a curved plane formation length of the curved plane in the travel direction of the support body while $L_2$ represents an orthogonal length which intersects $L_1$ and $\theta$ represents an interior angle defined by $L_2/L_1$.

2. A paint coating apparatus, comprising:

a die head having a front lip, a first paint discharge slit, an intermediate lip, a second paint discharge slit, and a rear lip arranged in an upstream order at least in the travel direction of a support body, the die head further having a curved plane, the curved plane fonned at a ridge line wherein the ridge line is formed by a tip surface of the intermediate lip and a wall surface of the second paint discharge slit, the curved plane being positioned oblique to the support body, the curved plane formed at the ridge line satisfies the relationship $$\text{Log}=-0.44\text{Log}(L_1/\text{paint coating thickness})+1.5$$

where $L_1$ represents a curved plane formation length of the curved plane in the travel direction of the support body while $L_2$ represents an orthogonal length which intersects $L_1$ and represents an interior angle defined by $L_2/L_1$.

* * * * *